US008468292B2

(12) United States Patent
Aszmann et al.

(10) Patent No.: US 8,468,292 B2
(45) Date of Patent: Jun. 18, 2013

(54) SOLID STATE DRIVE DATA STORAGE SYSTEM AND METHOD

(75) Inventors: Lawrence E. Aszmann, Prior Lake, MN (US); Michael J. Klemm, Minnetonka, MN (US); Michael H. Pittelko, Chaska, MN (US)

(73) Assignee: Compellent Technologies, Eden Prairie, MN (US)

( * ) Notice: Subject to any disclaimer, the term of this patent is extended or adjusted under 35 U.S.C. 154(b) by 663 days.

(21) Appl. No.: 12/501,907

(22) Filed: Jul. 13, 2009

(65) Prior Publication Data

US 2011/0010488 A1    Jan. 13, 2011

(51) Int. Cl.
*G06F 12/00*    (2006.01)

(52) U.S. Cl.
USPC ............... 711/103; 711/154; 711/E21.001; 711/E21.008

(58) Field of Classification Search
USPC ............... 711/103, 154, E12.008, E12.001
See application file for complete search history.

(56) References Cited

U.S. PATENT DOCUMENTS

| | | |
|---|---|---|
| 5,155,835 A | 10/1992 | Belsan |
| 5,274,807 A | 12/1993 | Hoshen et al. |
| 5,276,867 A | 1/1994 | Kenley et al. |
| 5,327,535 A | 7/1994 | Ogata et al. |
| 5,331,646 A | 7/1994 | Krueger et al. |
| 5,371,882 A | 12/1994 | Ludlam |
| 5,390,327 A | 2/1995 | Lubbers |
| 5,548,740 A | 8/1996 | Kiyohara |
| 5,572,661 A | 11/1996 | Jacobson |
| 5,644,701 A | 7/1997 | Takewaki |
| 5,659,704 A | 8/1997 | Burkes et al. |
| 5,696,934 A | 12/1997 | Jacobson et al. |
| 5,742,792 A | 4/1998 | Yanai et al. |
| 5,835,953 A | 11/1998 | Ohran |
| 5,897,661 A | 4/1999 | Baranovsky et al. |
| RE36,462 E | 12/1999 | Chang et al. |
| 6,052,759 A | 4/2000 | Stallmo et al. |
| 6,052,797 A | 4/2000 | Ofek et al. |
| 6,058,489 A | 5/2000 | Schultz et al. |
| 6,070,249 A | 5/2000 | Lee |
| 6,073,218 A | 6/2000 | DeKoning et al. |
| 6,073,221 A | 6/2000 | Beal et al. |
| 6,073,222 A | 6/2000 | Ohran |
| 6,078,932 A | 6/2000 | Haye et al. |
| RE36,846 E | 8/2000 | Ng et al. |

(Continued)

FOREIGN PATENT DOCUMENTS

| | | |
|---|---|---|
| EP | 0 757 317 A2 | 2/1997 |
| EP | 0780758 | 6/1997 |

(Continued)

OTHER PUBLICATIONS

"The Compaq Enterprise Network Storage Architecture: An Overview", source(s): Compaq, May 2000, pp. 1-22.

(Continued)

*Primary Examiner* — Midys Rojas
(74) *Attorney, Agent, or Firm* — Winthrop & Weinstine, P.A.

(57) ABSTRACT

The present disclosure relates to a data storage system and method that includes at least two solid state devices that can be classified in at least two different efficiency levels, wherein data progression is used to allocate data to the most cost-appropriate device according to the nature of the data.

20 Claims, 4 Drawing Sheets

U.S. PATENT DOCUMENTS

| | | |
|---|---|---|
| 6,115,781 A | 9/2000 | Howard |
| 6,192,444 B1 | 2/2001 | White et al. |
| 6,212,531 B1 | 4/2001 | Blea et al. |
| 6,269,431 B1 | 7/2001 | Dunham |
| 6,269,453 B1 | 7/2001 | Krantz |
| 6,275,897 B1 | 8/2001 | Bachmat |
| 6,275,898 B1 | 8/2001 | DeKoning |
| 6,282,671 B1 | 8/2001 | Islam et al. |
| 6,311,251 B1 | 10/2001 | Merritt et al. |
| 6,353,878 B1 | 3/2002 | Dunham |
| 6,366,987 B1 | 4/2002 | Tzelnic et al. |
| 6,366,988 B1 | 4/2002 | Skiba et al. |
| 6,415,296 B1 | 7/2002 | Challener et al. |
| 6,434,681 B1 | 8/2002 | Armangau |
| 6,438,638 B1 | 8/2002 | Jones et al. |
| 6,516,425 B1 | 2/2003 | Belhadj et al. |
| 6,560,615 B1 | 5/2003 | Zayas et al. |
| 6,591,335 B1 | 7/2003 | Sade et al. |
| 6,604,171 B1 | 8/2003 | Sade |
| 6,611,897 B2 | 8/2003 | Komachiya et al. |
| 6,618,794 B1 | 9/2003 | Sicola et al. |
| 6,636,778 B2 | 10/2003 | Basham et al. |
| 6,718,436 B2 | 4/2004 | Kim et al. |
| 6,732,125 B1 | 5/2004 | Autrey |
| 6,799,258 B1 | 9/2004 | Linde |
| 6,804,755 B2 | 10/2004 | Selkirk et al. |
| 6,826,711 B2 | 11/2004 | Moulton et al. |
| 6,839,827 B1 | 1/2005 | Beardsley et al. |
| 6,839,864 B2 | 1/2005 | Mambakkam et al. |
| 6,857,057 B2 | 2/2005 | Nelson et al. |
| 6,862,609 B2 | 3/2005 | Merkey |
| 6,877,109 B2 | 4/2005 | Delaney et al. |
| 6,883,065 B1 | 4/2005 | Pittelkow et al. |
| 6,904,599 B1 | 6/2005 | Cabrera et al. |
| 6,907,505 B2 | 6/2005 | Cochran et al. |
| 6,915,241 B2 | 7/2005 | Kohlmorgen et al. |
| 6,915,454 B1 | 7/2005 | Moore et al. |
| 6,938,123 B2 | 8/2005 | Willis et al. |
| 6,948,038 B2 | 9/2005 | Berkowitz et al. |
| 6,952,794 B2 | 10/2005 | Lu |
| 6,957,294 B1 | 10/2005 | Saunders et al. |
| 6,957,362 B2 | 10/2005 | Armangau |
| 6,981,114 B1 | 12/2005 | Wu et al. |
| 6,996,582 B2 | 2/2006 | Daniels et al. |
| 6,996,741 B1 | 2/2006 | Pittelkow et al. |
| 7,000,069 B2 | 2/2006 | Bruning et al. |
| 7,003,688 B1 | 2/2006 | Pittelkow et al. |
| 7,017,076 B2 | 3/2006 | Ohno et al. |
| 7,032,093 B1 | 4/2006 | Cameron |
| 7,039,778 B2 | 5/2006 | Yamasaki |
| 7,043,663 B1 | 5/2006 | Pittelkow et al. |
| 7,047,358 B2 | 5/2006 | Lee et al. |
| 7,051,182 B2 | 5/2006 | Blumenau et al. |
| 7,058,788 B2 | 6/2006 | Niles et al. |
| 7,069,468 B1 | 6/2006 | Olson et al. |
| 7,072,916 B1 | 7/2006 | Lewis et al. |
| 7,085,899 B2 | 8/2006 | Kim et al. |
| 7,085,956 B2 | 8/2006 | Petersen et al. |
| 7,089,395 B2 | 8/2006 | Jacobson et al. |
| 7,093,161 B1 | 8/2006 | Mambakkam et al. |
| 7,100,080 B2 | 8/2006 | Howe |
| 7,107,417 B2 | 9/2006 | Gibble et al. |
| 7,111,147 B1 | 9/2006 | Strange et al. |
| 7,124,272 B1 | 10/2006 | Kennedy et al. |
| 7,127,633 B1 | 10/2006 | Olson et al. |
| 7,133,884 B1 | 11/2006 | Murley et al. |
| 7,134,053 B1 | 11/2006 | Moore |
| 7,162,587 B2 | 1/2007 | Hiken et al. |
| 7,162,599 B2 | 1/2007 | Berkowitz et al. |
| 7,181,581 B2 | 2/2007 | Burkey |
| 7,184,933 B2 | 2/2007 | Prekeges et al. |
| 7,191,304 B1 | 3/2007 | Cameron et al. |
| 7,194,653 B1 | 3/2007 | Hadders et al. |
| 7,197,614 B2 | 3/2007 | Nowakowski |
| 7,216,258 B2 | 5/2007 | Ebsen et al. |
| 7,222,205 B2 | 5/2007 | Jones et al. |
| 7,228,441 B2 | 6/2007 | Fung |
| 7,251,713 B1 | 7/2007 | Zhang |
| 7,272,666 B2 | 9/2007 | Rowan et al. |
| 7,272,735 B2 | 9/2007 | Fung |
| 7,293,196 B2 | 11/2007 | Hicken et al. |
| 7,305,579 B2 | 12/2007 | Williams |
| 7,320,052 B2 | 1/2008 | Zimmer et al. |
| 7,380,113 B2 | 5/2008 | Ebsen et al. |
| 7,398,418 B2 | 7/2008 | Soran et al. |
| 7,404,102 B2 | 7/2008 | Soran et al. |
| 7,406,631 B2 | 7/2008 | Moore |
| 7,475,098 B2 | 1/2009 | Patterson et al. |
| 7,484,111 B2 | 1/2009 | Fung |
| 7,493,514 B2 | 2/2009 | Soran et al. |
| 7,512,822 B2 | 3/2009 | Fung |
| 7,533,283 B2 | 5/2009 | Fung |
| 7,552,350 B2 | 6/2009 | Fung |
| 7,558,976 B2 | 7/2009 | Fung |
| 7,562,239 B2 | 7/2009 | Fung |
| 7,574,622 B2 | 8/2009 | Soran et al. |
| 7,603,532 B2 | 10/2009 | Rajan et al. |
| 7,613,945 B2 | 11/2009 | Soran et al. |
| 7,672,226 B2 | 3/2010 | Shea |
| 7,702,948 B1 | 4/2010 | Kalman et al. |
| 2001/0020282 A1 | 9/2001 | Murotani et al. |
| 2002/0004912 A1 | 1/2002 | Fung |
| 2002/0004913 A1 | 1/2002 | Fung |
| 2002/0004915 A1 | 1/2002 | Fung |
| 2002/0007438 A1 | 1/2002 | Lee |
| 2002/0007463 A1 | 1/2002 | Fung |
| 2002/0007464 A1 | 1/2002 | Fung |
| 2002/0053009 A1 | 5/2002 | Selkirk et al. |
| 2002/0056031 A1 | 5/2002 | Skiba et al. |
| 2002/0062454 A1 | 5/2002 | Fung |
| 2002/0073278 A1 | 6/2002 | McDowell |
| 2002/0103969 A1 | 8/2002 | Koizumi et al. |
| 2002/0112113 A1 | 8/2002 | Karpoff et al. |
| 2002/0129214 A1 | 9/2002 | Sarkar |
| 2002/0188768 A1 | 12/2002 | Hirakawa et al. |
| 2003/0005248 A1 | 1/2003 | Selkirk et al. |
| 2003/0009619 A1 | 1/2003 | Kano et al. |
| 2003/0046270 A1 | 3/2003 | Leung et al. |
| 2003/0065901 A1 | 4/2003 | Krishnamurthy |
| 2003/0110263 A1 | 6/2003 | Shillo |
| 2003/0182301 A1 | 9/2003 | Patterson et al. |
| 2003/0182503 A1 | 9/2003 | Leong et al. |
| 2003/0188208 A1 | 10/2003 | Fung |
| 2003/0200473 A1 | 10/2003 | Fung |
| 2003/0212865 A1 | 11/2003 | Hicken et al. |
| 2003/0221060 A1 | 11/2003 | Umberger et al. |
| 2004/0030822 A1 | 2/2004 | Rajan et al. |
| 2004/0030951 A1 | 2/2004 | Armangau |
| 2004/0088505 A1 | 5/2004 | Watanabe |
| 2004/0107222 A1 | 6/2004 | Venkatesh et al. |
| 2004/0107315 A1 | 6/2004 | Watanabe et al. |
| 2004/0111558 A1 | 6/2004 | Kistler et al. |
| 2004/0117572 A1 | 6/2004 | Welsh et al. |
| 2004/0133742 A1 | 7/2004 | Vasudevan et al. |
| 2004/0163009 A1 | 8/2004 | Goldstein et al. |
| 2004/0172577 A1 | 9/2004 | Tan et al. |
| 2005/0010618 A1 | 1/2005 | Hayden |
| 2005/0010731 A1 | 1/2005 | Zalewski et al. |
| 2005/0027938 A1 | 2/2005 | Burkey |
| 2005/0055603 A1 | 3/2005 | Soran et al. |
| 2005/0065962 A1 | 3/2005 | Rowan et al. |
| 2005/0066095 A1* | 3/2005 | Mullick et al. ................ 710/200 |
| 2005/0108582 A1 | 5/2005 | Fung |
| 2005/0182992 A1 | 8/2005 | Land et al. |
| 2005/0262325 A1 | 11/2005 | Shmueli et al. |
| 2006/0031287 A1 | 2/2006 | Ulrich |
| 2006/0093282 A1 | 5/2006 | Shepherd et al. |
| 2006/0107006 A1 | 5/2006 | Green et al. |
| 2006/0161752 A1 | 7/2006 | Burkey |
| 2006/0161808 A1 | 7/2006 | Burkey |
| 2006/0179218 A1 | 8/2006 | Burkey |
| 2006/0206536 A1 | 9/2006 | Sawdon et al. |
| 2006/0218360 A1 | 9/2006 | Burkey |
| 2006/0230244 A1 | 10/2006 | Amarendran et al. |
| 2006/0248324 A1 | 11/2006 | Fung |
| 2006/0248325 A1 | 11/2006 | Fung |
| 2006/0248358 A1 | 11/2006 | Fung |

| | | | | | | |
|---|---|---|---|---|---|---|
| 2006/0248359 | A1 | 11/2006 | Fung | JP | 7200367 | 8/1995 |
| 2006/0248360 | A1 | 11/2006 | Fung | JP | 8-44503 | 2/1996 |
| 2006/0248361 | A1 | 11/2006 | Fung | JP | 8-278850 | 10/1996 |
| 2006/0253669 | A1 | 11/2006 | Lobdell | JP | 69028/1997 | 3/1997 |
| 2006/0253717 | A1 | 11/2006 | Fung | JP | 9-128305 | 5/1997 |
| 2006/0259797 | A1 | 11/2006 | Fung | JP | 254628/1998 | 9/1998 |
| 2006/0265608 | A1 | 11/2006 | Fung | JP | 327803/1999 | 11/1999 |
| 2006/0265609 | A1 | 11/2006 | Fung | JP | 2002-132343 | 5/2000 |
| 2006/0271604 | A1 | 11/2006 | Shoens | JP | 2001-147785 | 5/2001 |
| 2007/0016749 | A1 | 1/2007 | Nakamura et al. | JP | 2001-337850 | 12/2001 |
| 2007/0016754 | A1 | 1/2007 | Testardi | JP | 2001-344139 | 12/2001 |
| 2007/0101173 | A1 | 5/2007 | Fung | JP | 2002-32197 | 1/2002 |
| 2007/0180306 | A1 | 8/2007 | Soran et al. | JP | 2002-73393 | 3/2002 |
| 2007/0234110 | A1 | 10/2007 | Soran et al. | JP | 2002-278819 | 9/2002 |
| 2007/0240006 | A1 | 10/2007 | Fung | JP | 2002-366398 | 12/2002 |
| 2007/0245165 | A1 | 10/2007 | Fung | JP | 2003-15915 | 1/2003 |
| 2007/0260830 | A1 | 11/2007 | Faibish et al. | JP | 2003-50724 | 2/2003 |
| 2007/0266066 | A1 | 11/2007 | Kapoor et al. | JP | 2005-512191 | 4/2005 |
| 2007/0288401 | A1 | 12/2007 | Hood et al. | WO | WO 00/13077 | 3/2000 |
| 2008/0005468 | A1 | 1/2008 | Faibish et al. | WO | WO 02/25445 | 3/2002 |
| 2008/0091877 | A1 | 4/2008 | Klemm et al. | WO | WO 03/048941 | 6/2003 |
| 2008/0140918 | A1* | 6/2008 | Sutardja ........................ 711/103 | WO | WO 2005017737 | 2/2005 |
| 2008/0288546 | A1 | 11/2008 | Adkins et al. | | | |
| 2009/0132617 | A1 | 5/2009 | Soran et al. | | | |
| 2009/0138755 | A1 | 5/2009 | Soran et al. | | | |
| 2009/0235104 | A1 | 9/2009 | Fung | | | |
| 2009/0300412 | A1 | 12/2009 | Soran et al. | | | |
| 2010/0037023 | A1 | 2/2010 | Aszmann et al. | | | |

FOREIGN PATENT DOCUMENTS

| | | |
|---|---|---|
| EP | 1 462 927 A2 | 9/2004 |
| EP | 0 706 113 A2 | 8/2005 |
| GB | 2 373 075 | 9/2002 |
| JP | 179035/1987 | 8/1987 |
| JP | 3-259320 | 11/1991 |
| JP | 73221/1993 | 3/1993 |
| JP | 187201/1994 | 7/1994 |

OTHER PUBLICATIONS

Massiglia, P., "Chapter 11: Dynamic Data Mapping", The RAIDbook. A Source for RAID Technology, Feb. 1997; pp. 197-208.

Wilkes, John, et al., "The HP AutoRAID Hierarchical Storage System", ACM Transactions on Computer Systems, Association for Computing Machinery, ACM Transactions on Computer Systems, vol. 14, No. 1, Feb. 1996; pp. 108-136.

The PC Guide, "RAID Level 7", 2001, Retrieved from http://www.pcguide.com/ref/hdd/perf/raid/levels/singleLevel7-c.html on Sep. 13, 2010. 3 pages.

* cited by examiner

SOLID STATE DRIVE DATA STORAGE SYSTEM AND METHOD

FIELD OF THE INVENTION

The present disclosure generally relates to a solid state drive data storage system and method. More particularly, the present disclosure relates to a data storage system that includes solid state drives utilizing data progression.

BACKGROUND OF THE INVENTION

The use of solid state drives (SSDs) in data systems is increasing. Solid state drives are advantageous over hard disk drives (HDD) because SSDs have no moving parts. Thus, SSDs are not as fragile as HDDs. Further, because SSDs have no mechanical delay, SSDs are not subject to the relatively lengthy access times, seek times and latency to which HDDs are subject. For this reason, SSDs are usually much faster than HDDs. A significant drawback of SSDs, however, is their relatively high cost compared to HDDs.

SSDs can be based on either volatile (RAM-based) or non-volatile (flash) memory. Non-volatile memory can maintain information even when there is no power, whereas volatile memory requires continual power to maintain stored information. Flash memory stores information in memory cells that are made from floating-gate transistors. Solid state devices include single-level cell devices (SLC) and multi-level cell devices (MLC), for example. SLC devices store only one bit of information per cell, whereas MLC devices can store more than one bit of information per cell. Memory cells can be either NOR gate flash or NAND gate flash. NOR allows for random-access reading and NAND allows only page access.

There is a need for an improved data storage system and method that includes SSDs and utilizes data progression to improve the efficiency of the system.

BRIEF SUMMARY OF THE INVENTION

The present disclosure relates to a data storage system that includes solid state drive devices utilizing data progression.

The present disclosure, in one embodiment, relates to a data storage system that includes at least two solid state devices that can be classified in at least two different efficiency levels, wherein data progression is used to allocate data to the most cost-appropriate device according to the nature of the data or to the most appropriate performance oriented device according to how frequently the data is accessed.

The present disclosure, in another embodiment, relates to a data storage system wherein the plurality of solid state devices includes at least one read/write optimized device, and at least one read-optimized device.

The present disclosure, in a further embodiment, relates to a data storage system, wherein at least one of the read/write optimized SSDs is a single-level cell device, and wherein at least one of the read optimized SSDs is a multi-level cell device.

In a further embodiment, at least one of the solid state devices can be configured to function as either a read/write performance optimized device or a read performance optimized device.

In yet another embodiment of the present disclosure, a solid state device of one storage efficiency level may be reconfigured into a solid state device of another storage efficiency level.

The present disclosure, in a further embodiment, relates to a data storage system, wherein data progression is used to automatically move data between read/write optimized SSDs and read optimized SSDs.

The present disclosure, in one embodiment, relates to a data storage system wherein the read/write data is segregated on read/write optimized devices and the read data is segregated on read optimized devices.

In another embodiment, the read/write data is segregated on single-level cell devices, and the read data is segregated on multi-level cell devices.

In another embodiment of the present disclosure, data progression is used to move infrequently accessed data to a less costly storage device, and to move frequently accessed data to a faster storage device within the data storage system.

The present disclosure, in another embodiment, relates to a data storage system, wherein read/write data is separately bundled for execution, and read data is separately bundled for execution by using data progression to distinguish between read/write data and read data.

The present disclosure, in one embodiment, relates to a data storage system, wherein multi-level cell devices, and single-level cell devices can be either NOR or NAND devices.

In another embodiment of the present disclosure, the data storage system can include at least one hard disk drive in addition to the plurality of SSD devices.

The present disclosure, in one embodiment, relates to a data storage system, wherein the solid state devices use either RAM-based memory or flash-based memory.

The present disclosure, in another embodiment, relates to a method for efficiently storing data in a data storage system that includes a plurality of solid state devices that can be classified in at least two different efficiency levels, wherein data progression is used to move data to the most cost-appropriate device.

BRIEF DESCRIPTION OF THE DRAWINGS

While the specification concludes with claims particularly pointing out and distinctly claiming the subject matter that is regarded as forming the various embodiments of the present disclosure, it is believed that the disclosure will be better understood from the following description taken in conjunction with the accompanying Figures, in which:

DETAILED DESCRIPTION

The present disclosure relates to a novel and advantageous data storage system ("system") that includes solid state drives (SSD) utilizing data progression (DP). Data storage systems may include: hard disk drives (HDD); SSDs; other suitable types of storage devices; or any combination thereof. Regardless of what components comprise a data storage system, an overall goal for the system is to store data in the most efficient, reliable, and least costly manner. One method that can be used to meet these objectives is data progression (DP), which moves data gradually to storage space of appropriate cost. For example, DP may move non-recently accessed data and historical snapshot data to less expensive storage. It will be recognized, however, that DP can be used to move data of any type from one device to another or from one storage space to another in order to increase the efficiency of the system. For a detailed description of DP and historical snapshot data, see U.S. Pat. No. 7,398,418, issued Jul. 8, 2008, (Ser. No. 11/689, 862), entitled "Virtual Disk Drive System and Method," as well as published U.S. patent application Ser. No. 11/753, 357, entitled "Data Progression Disk Locality Optimization System and Method," and U.S. patent application No. 61/086, 917, filed Aug. 7, 2008, entitled, "System and Method for Transferring Data Between Different RAID Data Storage Types for Current Data and Replay Data," each of which are herein incorporated by reference in their entirety.

Including SSDs in data storage systems is advantageous over using only hard disk drives (HDD), for example, because SSDs are much faster and more reliable than HDDs. A drawback of SSDs, however, is their cost. Ideally, a data storage system could take advantage of the speed and reliability of SSDs, but in a manner that is efficient, so as to minimize the impact of the increased monetary cost of SSDs relative to HDDs.

Figure 1:
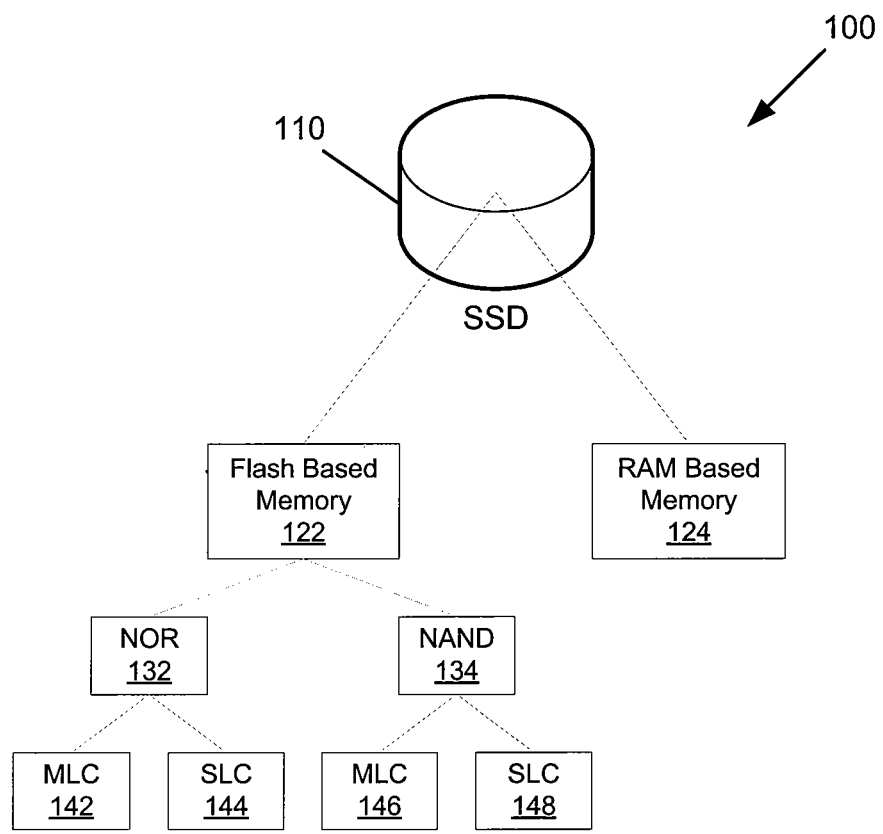
FIG. 1 illustrates different types of SSD devices that could be included in a data storage system of the present disclosure according to various embodiments.

SSDs gain their advantage over HDDs because there are no moving parts in an SSD, meaning that there may be none of the mechanical delays associated with HDDs, such as lengthy access times, seek times, and latency. As shown in FIG. 1, SSDs 110 can be based on either volatile (RAM-based) memory 124 or non-volatile (flash) memory 122. Non-volatile memory does not require constant power in order to maintain stored information, whereas volatile memory does require continual power to maintain stored information. Non-volatile flash memory stores information in memory cells that are made from floating-gate transistors. Flash memory may be either NOR 132 or NAND 134. Single-level cell (SLC) devices store only one bit of information per cell, whereas multi-level cell (MLC) devices may store more than one bit of information per cell. SLC 144, 148 and MLC 142, 146 devices may be either NOR or NAND flash devices.

Because only one bit of information is stored per cell in SLC memory, it may have faster transfer speeds, use less power, and have higher cell endurance than MLC memory, which can store multiple bits of information per cell. SLC memory generally costs more money to manufacture and purchase than MLC memory because it stores less information per cell. Conversely, MLC memory may be less costly to manufacture but may have slower transfer speeds, consume more power and have lower cell endurance than SLC memory.

Flash memory, in particular, may only be capable of a finite number of erase-write cycles before the wear begins to erode the integrity of the storage. This deterioration of storage integrity may be partially offset by wear leveling, a process whereby firmware or special file systems count writes, and blocks are dynamically remapped in order to spread write operations between sectors. Generally, when a flash store is to be updated, the file system can write a new copy of the changed data over to a fresh block, remap the file pointers, and then erase the old block later when it has time.

Another approach may be to perform write verification and remapping to spare sectors in case of write failure. Most SSD designs include spare memory areas used to substitute for areas that wear out over time due to an inordinate amount of writes, or normal device manufacturing defects. Flash cells wearing out through writes may occur with any flash design, and may be a result of various physical factors. By incorporating a large amount of spare space, the effective write endurance, or number of writes to a given logical block address (LBA) may be greatly enhanced by spreading the total number of writes over many more physical flash memory areas. Over time, as one area wears, the SSD firmware may automatically substitute it with another area that is less worn, without intervention by the host controller. The more spare areas there are, the more write optimized a drive may generally be, and less overhead may be required to support any given write to the device. However, less usable LBA space may be available for a given amount of installed flash memory for a particular SSD.

SSDs may be configured to perform particular types of operations optimally. An SSD, for instance, may be configured to be read/write optimized (have a large amount of spares), or read optimized (have fewer spares with more usable LBA space). Accordingly, both SLC and MLC devices, for example, may be read/write optimized or read (or capacity) optimized.

According to one embodiment of the present disclosure, SSDs that are read/write optimized may be combined with read optimized SSDs in a data storage system, such that each type of memory is used cost efficiently. In this way, a data storage system may benefit from the advantages that SSDs offer over HDDs, or other data storage devices, while minimizing cost by avoiding inefficiencies in storage. For example, a data storage system may include both SLC and MLC devices, which are each configured to most efficiently store data according to whether the data is read/write data or read data.

Data progression (DP) may be used, for example, to efficiently allocate data between SSDs of different efficiency levels, such as SLC and MLC devices in a data storage system. DP may be used to move data gradually to storage space of appropriate cost, allowing a user to add additional SSD drives only when they are actually needed. This may significantly reduce the overall cost of the data storage system.

Data progression may be used to move non-recently accessed data and historical snapshot data to less expensive storage; for example, from SLC memory to MLC memory. For non-recently accessed data, DP may gradually reduce the cost of storage for any page that has not been recently accessed. As was mentioned above, however, DP can be used to move any type of data from one device to another, or one storage space to another, in order to store the data in the system more efficiently. One advantage of DP includes maintaining high I/O access to data currently being accessed and reducing the need to purchase fast but expensive solid state drives.

In operation, DP may determine the cost of storage using the cost of the physical media and the efficiency of devices, such as read/write optimized devices and read optimized devices in the system. DP can include the ability to automatically classify drives in the system relative to the rest of the drives within a system. The system examines a drive to determine its performance relative to the other drives in the system. The most efficient (e.g. faster, more reliable, etc.) drives are classified in a higher value classification, and the slower drives are classified in a lower value classification. As drives are added to a system, the system may automatically rebalance the value classifications of the drives.

Single-level cell memory, for example, is characterized by having both great read durability and great write durability coupled with a higher monetary cost for the SSD device. Multi-level cell memory, on the other hand, may also have great read durability coupled with a lower monetary cost for the SSD, but it has relatively poor write durability. Both the SLC and the MLC may be configured to be either read/write optimized or read optimized.

Figure 2:
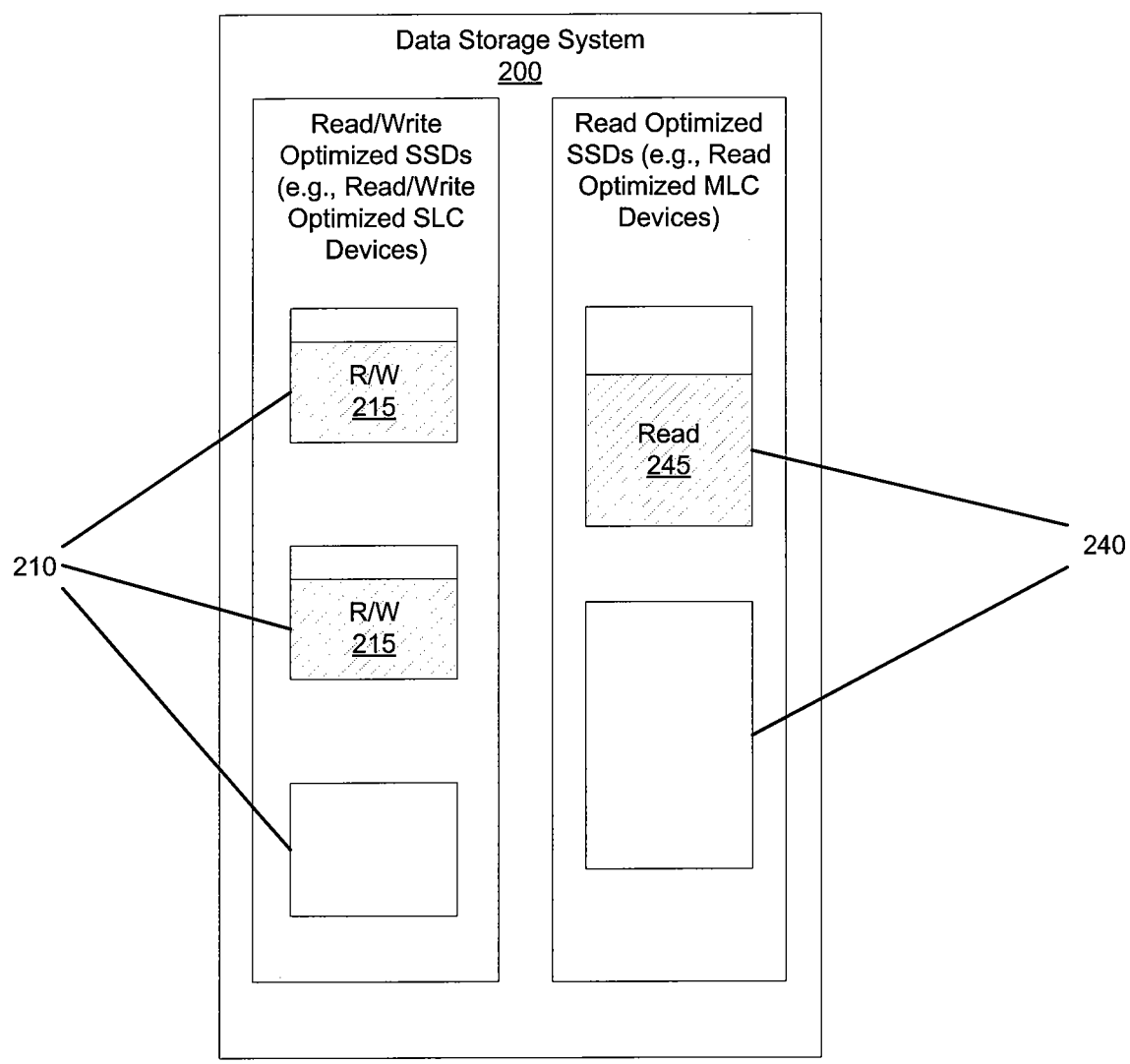
FIG. 2 illustrates a data storage system according to one embodiment of the present disclosure, wherein read/write data is segregated on specific and different SSD device types than read data.

FIG. 2 illustrates one embodiment of the present disclosure, whereby a data storage system 200 may be a hybrid solution including both read optimized SSDs 240, for example read-optimized MLC devices, and read/write optimized SSDs 210, for example read/write optimized SLC devices. Read/write data 215 can be segregated on the read/write optimized devices, for example the more efficient and higher cost SLC read/write optimized devices 210, while read data 245 can be segregated on read optimized devices, for example the MLC read optimized devices 240. It will be understood by those in the art that read optimized data may also be stored on SLC read optimized devices. Allocating data in this way preserves device reliability while significantly decreasing hardware costs. Storage efficiencies are achieved in this embodiment because when read data and read/write data are mixed together on the same SSD device, a significant performance drop can occur. Segregating the read data 240 and the read/write data 215 according to this embodiment of the present disclosure may provide a significant performance boost.

In one embodiment, a data storage system may include snapshot functions to allow efficient storage of Point-In-Time Copies (PITCs) of a virtual volume matrix, instant data fusion, and data instant replay for data backup, recovery, testing, etc., remote data storage, and data progression, etc., each of which is described in detail in U.S. Pat. No. 7,398,418, which was previously incorporated by reference in its entirety.

In another embodiment of the present disclosure, DP can be used to move infrequently accessed data from a high cost storage device to a storage device of appropriate cost. Similarly, frequently accessed data may be moved from a less efficient storage device to a more efficient storage device. For instance, when new data is being written to a volume it may first go to an SSD device that is read/write optimized. Once a replay is taken, for example, the data could move to a read optimized SSD device. Should that data become less active, the data may be moved to a lower tier of storage, for instance an HDD.

Figure 3:
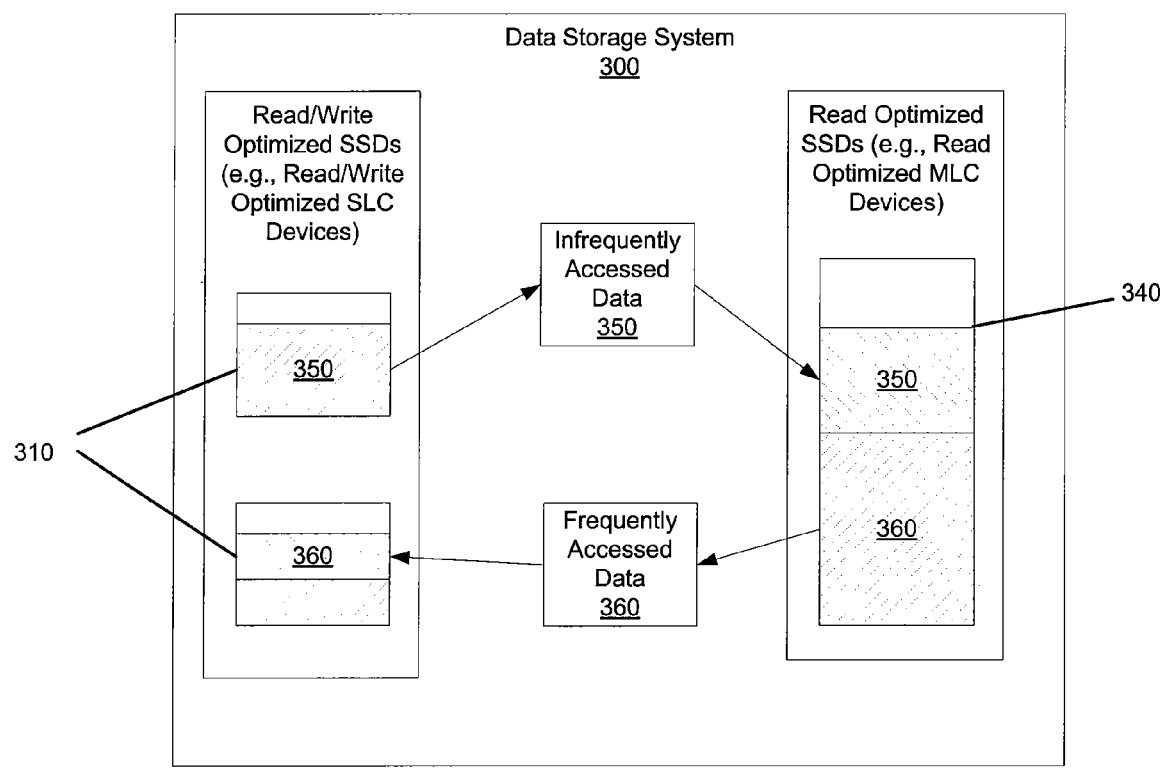
FIG. 3 illustrates a data storage system according to one embodiment of the present disclosure, whereby data progression is used to move data to device types of appropriate cost, according to frequency of access.

FIG. 3 shows an embodiment of the present disclosure where DP may be used to move infrequently accessed data 350 from a read/write optimized SSD device 310 to a read optimized SSD device 340. Similarly, frequently accessed data 360, or read data that needs to be written to, may be moved from a read optimized SSD device 340 to a read/write optimized SSD device 310 by means of DP. In another embodiment, infrequently or very infrequently accessed data may be moved to an even lower tier device, such as an HDD or tape backup. Data storage efficiencies are achieved in this embodiment because infrequently accessed data does not take up valuable high-cost storage. Rather, less costly storage is used for infrequently accessed data. In instances where the read/write optimized device is an SLC device, and the read optimized device is an MLC device, storage efficiency is also gained by moving frequently used data to a faster and more reliable storage device, as reliability is increased for data stored on an SLC device as opposed to an MLC device, and write speed is increased for data stored on an SLC read/write optimized device as opposed to a read optimized SLC or MLC device.

However, as was discussed above, mixing read/write and read data together on the same SSD device may cause a significant performance drop. Some SSDs may be extremely sensitive to mixing read and write operations in their queues. In this embodiment, read/write data and read optimized data may coexist simultaneously on the same SSD device. For example, one SLC SSD device could contain frequently accessed read/write data, as well as frequently accessed read data. To minimize the performance drop associated with having different data types on the same device, but still achieve the efficiencies gained by using DP to store data cost-appropriately according to frequency of use, read data may be bundled together for execution, and read/write data may be bundled together for execution. Issuing groups of I/Os into batches of reads and batches of writes may greatly enhance I/O performance. Bundling each data type separately in this manner, prior to execution, may alleviate the performance impact of mixing the two operations together on a single SSD device.

Not only may both SLC and MLC devices be read/write optimized or read optimized, but both SLC and MLC devices may be converted on demand from read/write optimized devices to read optimized devices. Conversely, both SLC and MLC devices may be converted from read optimized devices to read/write optimized devices. An SLC device that is read/write optimized or read optimized may be very efficient in either optimization. An MLC device that is read optimized may be very read efficient, but when it is read/write optimized, may only be marginally efficient, and have lower overall endurance.

Figure 4A:
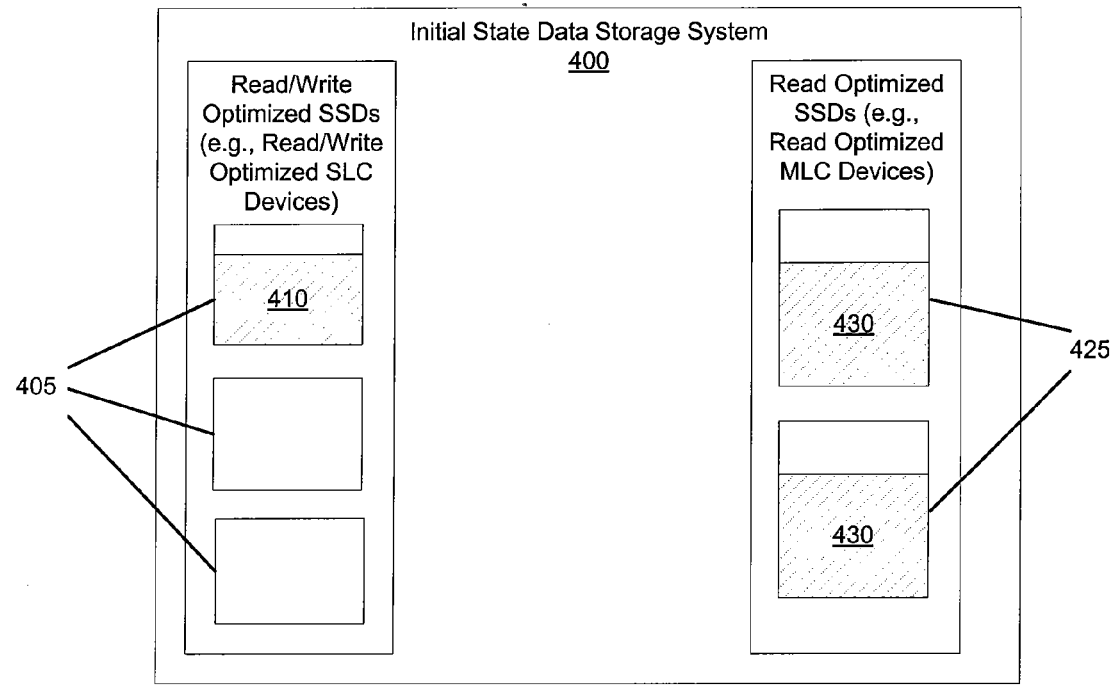
FIG. 4a illustrates a data storage system in a first state including an example number of read/write optimized devices, an example number of read optimized devices, and an example amount of data of different types.
Figure 4B:
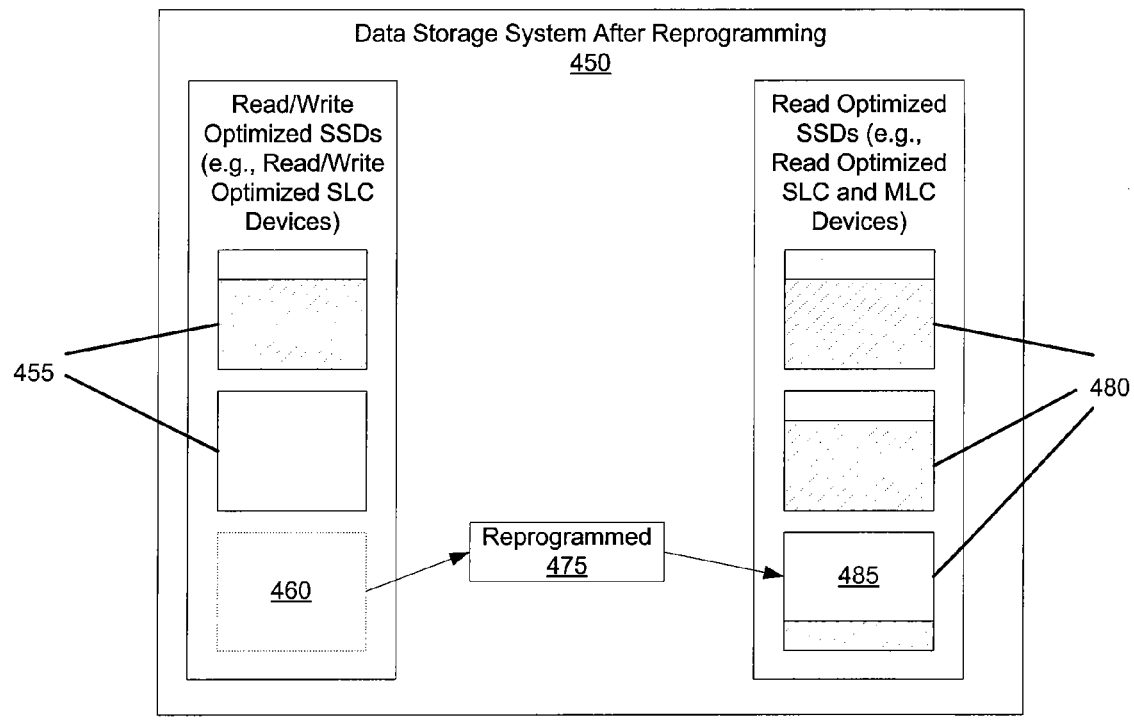
FIG. 4b illustrates the data storage system illustrated in FIG. 4a after a read/write optimized device has been reprogrammed into a read optimized device.

FIGS. 4a and 4b show an embodiment of the present disclosure, whereby an SSD device may be reconfigured on demand. FIG. 4a shows a system 400 in an initial state. The initial state system includes three devices, which are read/write optimized 405, for example three SLC read/write optimized devices. While three read/write optimized devices are shown, it will be recognized that any number of read/write optimized and/or read optimized devices may be included in the system and the number of devices shown in the FIGS. is simply for illustrative purposes, and is in no way limiting. In an initial state, only one of the read/write devices is needed to store the amount of data 410 that may most efficiently be stored on read/write devices according to embodiments discussed above. FIG. 4a shows that the initial state system 400 also includes two read optimized devices 425, for example two MLC read optimized devices. As can be seen, both read optimized devices 425 in the system 400 are used to store the amount of data 430 in the system that is most efficiently stored on read optimized devices according to embodiments discussed above.

It will be appreciated from viewing the initial state system 400 that it may be advantageous to have additional read optimized devices, and that there may be more read/write optimized devices than are currently needed. According to this embodiment, the system recognizes that the system would function more efficiently, given the nature of the data stored in the system, and the types of devices in the system, if a read/write optimized device were reprogrammed into a read optimized device. FIG. 4b shows the system after such a reprogramming has occurred. In the reprogrammed system 450, one of the read/write optimized devices 460 has been reprogrammed 475 into a read optimized device 485.

An SSD device that is read/write optimized 460 may be converted 475 to an SSD that is read optimized 485 by adjusting the number of spare memory areas available in the device during operation of the storage controller. If a read/write optimized SSD device 460 is adjusted 475 to function as a read optimized SSD 485, it may have less write endurance, have more usable capacity, and be more suitable for only reading data. One advantage of this embodiment may be that an SLC device that is read/write optimized may be very expensive per bit, but when reconfigured to be read optimized, the effective cost per bit is lower, and it may perform better than a read optimized MLC device. Further, conversion from a read/write optimized device to a read optimized device may increase or even double the device's addressable storage capacity.

In another embodiment of the present disclosure, an MLC SSD, for example, that is read/write optimized may be reconfigured as a read optimized device with fewer spares. The read optimized MLC may have lower write endurance than a read/write MLC device with more spares. A read/write optimized MLC may be reconfigured to a read optimized MLC through a configuration operation that may be performed with the drive in use through software and standard small computer system interface (SCSI) protocol commands to select the appropriate vendor device options.

In another embodiment, a read optimized MLC device may be reconfigured into a lower capacity read/write MLC device with a corresponding increase in the effective cost per bit. One skilled in the art will recognize that through a combination of these devices, nearly any price or performance characteristic between those of read/write SSDs, such as SLC devices, and read optimized SSDs, such as MLC devices, can be achieved. The configuration of SSD devices, for instance whether an SSD is read/write or read optimized, or the reconfiguration of SSD devices, for instance from a read/write optimized device to a read optimized device or vice versa, may be performed on site without the physical modification of installed hardware, allowing the system to respond to changing needs.

In another embodiment of the present disclosure, the flash memory 122 cells can be either NOR gate flash 132 or NAND gate flash 134, as is shown in FIG. 1. For example, a data storage system may contain SSD flash devices that are: exclusively NOR flash; exclusively NAND flash; or the system may include a combination of devices, some of which are NOR flash and others of which are NAND flash. NOR flash may be used as a storage device by using the random-access programming of which NOR is capable. Some NOR devices may include read-while-write functionality where the code can continue to be executed even if a program or erase operation is happening in the background. However, the write speeds of NOR flash are not as fast as NAND flash. Also, in terms of data storage, NAND flash is capable of higher densities, larger capacities at lower cost, and faster sequential read speeds. It will be understood by those skilled in the art that using different combinations of NOR and/or NAND flash may provide additional storage efficiencies in a data storage system using SSDs.

In a further embodiment of the present disclosure, a data storage system may include one or more SLC SSD device of 147 GB, and one or more MLC SSD device of 750 GB, however, any suitable size and type of SSD may be used in the data storage system.

In a further embodiment of the present disclosure, DP may be used to automatically move data between read/write optimized SSDs and read optimized SSDs. Read optimized SSDs may be particularly efficient devices for storing data that has been frozen in time by a replay. Once a replay occurs, that data becomes read data. DP may write that data to an SSD only a few times per day, which may significantly reduce the number of erasure cycles occurring on that SSD.

In another embodiment of the present disclosure, a data storage system may include both SSDs and HDDs and/or other suitable storage devices. Data progression can be used to efficiently allocate data to the device of appropriate cost, as determined by the price, performance, capacity, and/or function of the drive. As discussed previously, DP includes the ability to automatically classify drives relative to the other drives within a system. The system examines a drive to determine its performance relative to the other drives in the system. The faster and/or more efficient drives are classified in a higher value classification, and the slower and/or less efficient drives are classified in a lower value classification. As drives are added to a system, the system automatically rebalances the value of classifications of the drives. For a detailed description of DP and historical snapshot data, see U.S. Pat. No. 7,398,418, issued Jul. 8, 2008, (Ser. No. 11/689,862), entitled "Virtual Disk Drive System and Method," as well as published U.S. patent application Ser. No. 11/753,357, entitled "Data Progression Disk Locality Optimization System and Method," both of which have previously been incorporated by reference in their entirety. In a system that includes both SSDs and HDDs, DP may be used to classify each drive type's speed relative to the others. All of the data storage efficiencies that can be obtained through the disclosures of the above mentioned patent and published application can apply to the HDDs included in a system combining SSDs and HDDs, such as efficiencies gained from RAID and DP.

In yet another embodiment of the present disclosure, the SSDs 110 of the present disclosure may use volatile RAM-based memory 124, such as synchronous dynamic random access memory (SDRAM), or dynamic random access memory (DRAM), collectively referred to as "RAM-based" memory, as shown in FIG. 1. In a further embodiment, a data storage system may use a combination of flash-based memory 122 SSD devices, and RAM-based memory 124 SSD devices. SSDs based on volatile RAM-based memory 124 may have faster read access times and write speeds than devices using flash memory 122. RAM-based SSD memory 124, however, may be more vulnerable to abrupt power loss. Further, RAM-based SSD memory 124 may require more power than flash memory 122. It will be recognized by those skilled in the art that a data storage system could include various combinations of SSD devices, some of which utilize flash memory, and others of which utilize RAM-based memory. Alternatively, a system may include only flash-based SSD devices, or may include only RAM-based SSD devices. Regardless of the combination of SSD devices included in the system, DP may be used to classify all of the drives in the system according to their speed, and then allocate, and/or move data to the most cost-appropriate device for that data type.

In the foregoing description, various embodiments of the disclosure have been presented for the purpose of illustration and description. They are not intended to be exhaustive or to limit the disclosure to the precise form disclosed. Obvious modifications or variations are possible in light of the above teachings. The embodiments were chosen and described to provide the best illustration of the principals of the disclosure and its practical application, and to enable one of ordinary skill in the art to utilize the various embodiments with various modifications as are suited to the particular use contemplated. All such modifications and variations are within the scope of the disclosure as determined by the appended claims when interpreted in accordance with the breadth they are fairly, legally, and equitably entitled.

We claim:

1. A data storage system comprising a plurality of solid state devices classified in at least two different efficiency levels, the plurality of solid state devices comprising a read/write optimized device and a read optimized device, wherein data progression is used to allocate read/write data to the read/write optimized device and read-only data to the read optimized device.

2. The system of claim 1, wherein the at least one read/write optimized device is a single-level cell device and the read optimized devices is a multi-level cell device.

3. The system of claim 2, wherein the multi-level cell device and the single-level cell device are NOR or NAND devices.

4. The system of claim 1, wherein read/write data is separately bundled for execution and read-only data is separately bundled for execution.

5. The system of claim 1, wherein at least one of the plurality of solid state devices can be reconfigured between a read/write optimized device and a read optimized device.

6. The system of claim 1, wherein the plurality of solid state devices includes at least one single-level cell device, and at least one multi-level cell device.

7. The system of claim 6, further including at least one hard disk drive.

8. The system of claim 6, wherein data progression is used to automatically move data between read/write optimized solid state drives and read optimized solid state drives.

9. The system of claim 8, wherein read/write data is separately bundled for execution and read optimized data is separately bundled for execution.

10. The system of claim 1, wherein data progression is further used to move infrequently accessed data to a less costly storage device, and to move frequently accessed data to a faster storage device.

11. The system of claim 1, further including at least one hard disk drive, and wherein data progression is further used to allocate data between the solid state devices and the hard disk drive based on at least one of the nature of the data and the access frequency of the data.

12. The system of claim 11, wherein read/write data is allocated to the read/write optimized device and read-only data first to the read optimized device and subsequently to the hard disk drive.

13. The system of claim 1, wherein the solid state devices comprise RAM-based memory or flash-based memory or both.

14. A method for efficiently storing data in a data storage system comprising at least two solid state devices of different efficiency levels wherein a solid state device with a higher efficiency is also read/write optimized and a solid state device with a lower efficiency is read optimized and the system comprising a hard disk drive, the method comprising allocating data between the at least two solid state devices and the hard disk drive based, at least in part, on at least one of the nature of the data and the access frequency of the data, wherein the optimization of the solid state devices is maintained.

15. The method of claim 14, wherein data is stored to a solid state device of a first efficiency level, and as data is used less frequently, the data is moved to the solid state device of a second efficiency level.

16. The method of claim 15, wherein the data is subsequently moved from the solid state device of the second efficiency level to the hard disk drive.

17. A data storage system comprising:
at least two solid state devices of different efficiency levels wherein a solid state device with a higher efficiency is also read/write optimized and a solid state device with a lower efficiency is read optimized; and
a hard disk drive,
wherein data is allocated between the at least two solid state devices and the hard disk drive based, at least in part, on at least one of the nature of the data and the access frequency of the data and the optimization of the solid state devices is maintained.

18. The system of claim 1, wherein the read/write optimized device comprises a larger percentage of spare sectors and a smaller percentage of logical block address space than the read optimized device.

19. The system of claim 1, wherein the read-only data is accessible only for reading.

20. The system of claim 19, wherein the read-only data comprises historical snapshot data.

* * * * *